United States Patent

[11] 3,608,726

| [72] | Inventor | Harold Crowther<br>Solihull, England |
|---|---|---|
| [21] | Appl. No. | 807,497 |
| [22] | Filed | Mar. 17, 1969 |
| [45] | Patented | Sept. 28, 1971 |
| [73] | Assignee | Joseph Lucas (Industries) Limited<br>Birmingham, England |

[54] LIQUID-FILTERING EQUIPMENT
13 Claims, 4 Drawing Figs.

[52] U.S. Cl. .................................... 210/234,
 210/249, 210/304, 210/456
[51] Int. Cl. .................................... B01d 35/02
[50] Field of Search .................................... 210/304,
 249, 134, 136, 232, 234, 235, 306, 311, 456, 512,
 453, 451

[56]  References Cited
UNITED STATES PATENTS

| 1,107,485 | 8/1914 | Bowser | 210/304 |
| 2,106,218 | 1/1938 | Krieck | 210/249 X |
| 2,511,800 | 6/1950 | Wilkinson | 210/249 |
| 2,983,384 | 5/1961 | Winslow | 210/304 X |
| 3,273,715 | 9/1966 | Rosaen | 210/234 X |

Primary Examiner—Frank A. Spear, Jr.
Attorney—Holman and Stern

ABSTRACT: A filter has a cup-shaped housing, which includes a liquid inlet, and a lid which includes a liquid outlet. The liquid inlet opens tangentially into a groove around the interior of the mouth of the housing. A baffle covers the groove opening and itself has openings through which the liquid passes. A filter element is mounted centrally within the housing and is surrounded by a sleeve which directs the liquid entering through the baffle towards the closed end of the housing before it passes through the filter to the outlet.

LIQUID-FILTERING EQUIPMENT

This invention relates to liquid-filtering equipment and has as an object to provide such equipment in a convenient form.

Liquid-filtering equipment in accordance with the invention comprises a casing constituted by a hollow body and a lid therefor, means for supporting a filter element within said casing, a liquid inlet and a liquid outlet in the casing, arranged, so as to be separated, in use, by the filter element, the casing being adapted to be received in an opening in a support therefor with the liquid inlet and outlet passages in the casing respectively in communication with liquid inlet and outlet ports of the support, the arrangement being such that the casing can be removed from the support as a unit without disturbing the filter element relative to the casing.

Reference is now made to the accompanying drawings in which.

Figure 1:
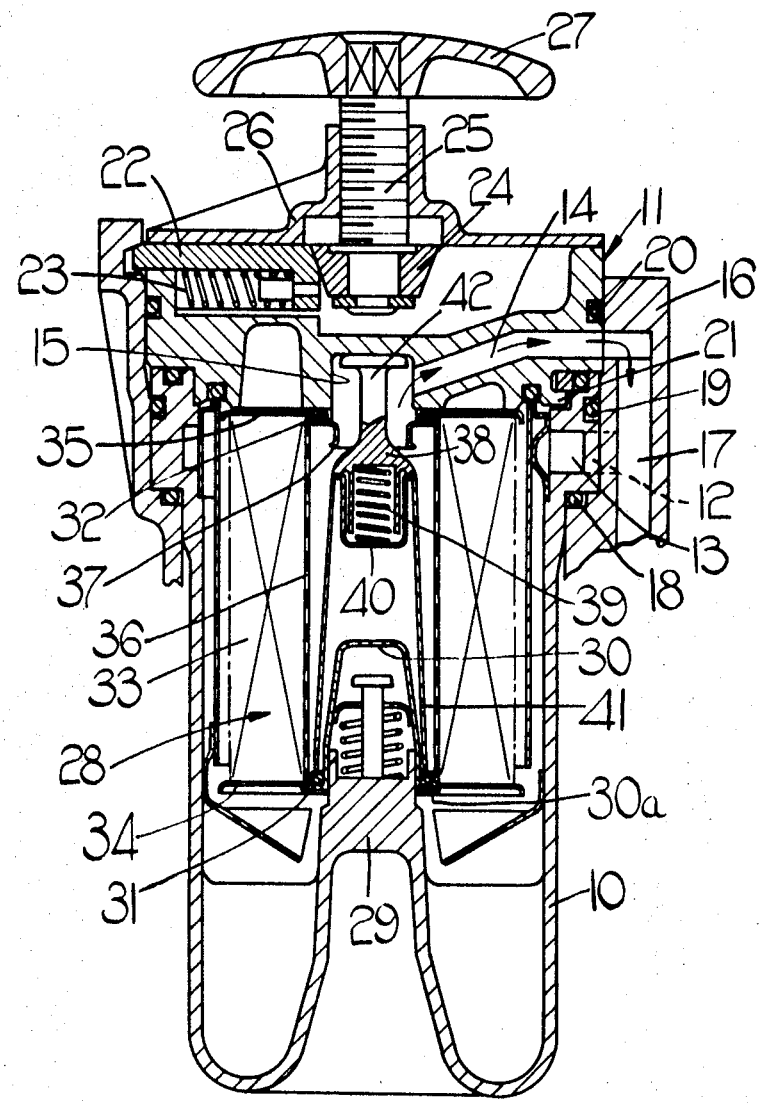
FIG. 1 is a sectional view of one example of the invention.

Referring firstly to FIG. 1 the liquid-filtering equipment shown includes a casing constituted by a hollow cup-shaped body 10 with a lid 11 therefore. An inlet for liquid to be filtered is formed in the sidewall of the body adjacent the mouth thereof, such inlet 12 communicating with a volute groove 13 inside the mouth of the body 10. The inlet 12 enters the groove 13 tangentially so as to cause a swirling flow therein. The casing is provided with an outlet passage 14 which is formed in the lid 11. The passage 14 communicates at one end with a central recess 15 in the lid 11. The inlet 12 and the outlet 14 both open onto the exterior of the housing on coaxial cylindrical wall portions thereof.

For use, the casing is inserted into a suitable socket provided in a support 16 which has a liquid outlet passage 17 and also a liquid inlet passage (not shown) opening into internal coaxial cylindrical surfaces at positions corresponding to the openings of the outlet 14 and the inlet 12 respectively. Three sealing rings 18, 19 and 20 are provided on the casing to isolate the inlet and outlet passages from one another when the casing is engaged in the support 16.

The lid 11 is attached to the body 10 by means of a bayonet-type fastening incorporating lugs 21 on the lid 11 which coact with L-shaped slots in the mouth of the body 10. For retaining the casing in the support 16 the lid slidably supports a plurality of radially slidable bolts 22 which are spring loaded by means of springs 23 to withdrawn positions. A frustoconical cam 24 on a screw 25 engaged with a cover 26 on the lid 11 is engageable with these bolts 22 to thrust them outwardly into recesses in the support 16. The screw 25 has a knob 27 nonrotatably attached thereto.

The casing is adapted to support a filter element 28 which separates the inlet 12 from the outlet 14. To this end the body 10 is provided with an internal spigot 29 on which a spring-loaded cup 30 is slidably mounted. This cup has a flange 30a which serves to compress against a flange 34 at the lower end of the filter element a sealing ring 31. A further sealing ring 32 is compressed between a flange 35 at the opposite end of the filter element and the lid 11 surrounding the recess 15 therein.

The filter element is of the type incorporating a concertina folded annular paper element 33 supported between end flanges 34 35 and surrounding a central perforated sleeve 36. The flange 35 is extended across the mouth of the internal space formed by the sleeve 36 to define a seat 37 against which a closure 38 is normally urged by a spring 39. The spring 39 engages a cup element 40 itself engaged with a tapered tubular piece 41 engaged at its opposite end with the flange 34. As shown in FIG. 1, when the filter element 28 is in position in the casing, an extension 42 on the closure 38 is engaged in the recess 15 in the housing to hold the closure 38 out of contact with the seat 37, so as to allow communication between the outlet passage 14 and the interior of the sleeve 36 of the filter element.

When it is required to replace the filter element the entire casing is withdrawn from the support 16 after the bolts 22 have been withdrawn, suitable cocks associated with the inlet and outlet passages in the support having previously been closed off. The lid 11 can then be easily removed from the body 10 and the filter element, with the closure 38 raised against its seat 37, can then be withdrawn. The contents of the body 10 can be disposed of before a fresh filter element 28 is inserted. It is thus possible to replace the filter element and service the equipment without any risk of unfiltered fuel entering the outlet passage 17.

Figure 2:
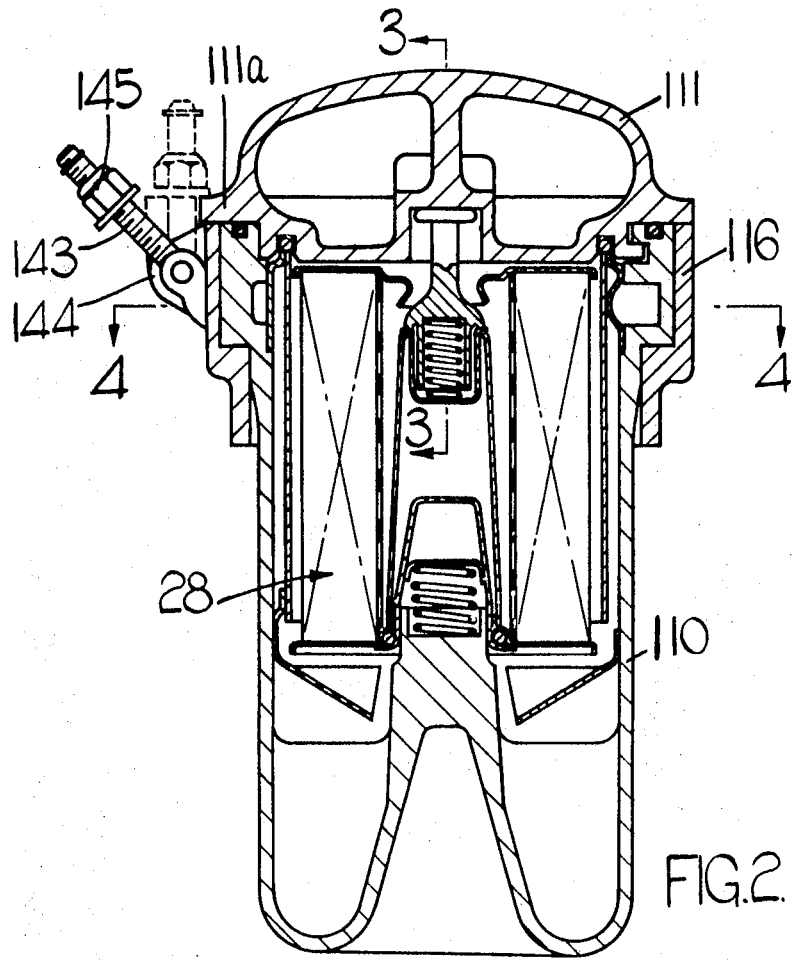
FIG. 2 is a section showing the different example of the invention.
Figure 3:
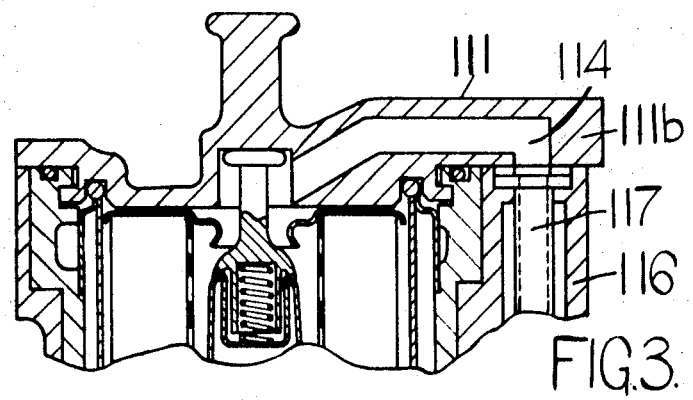
FIG. 3 is a fragmentary section on line 3—3 in FIG. 2.
Figure 4:
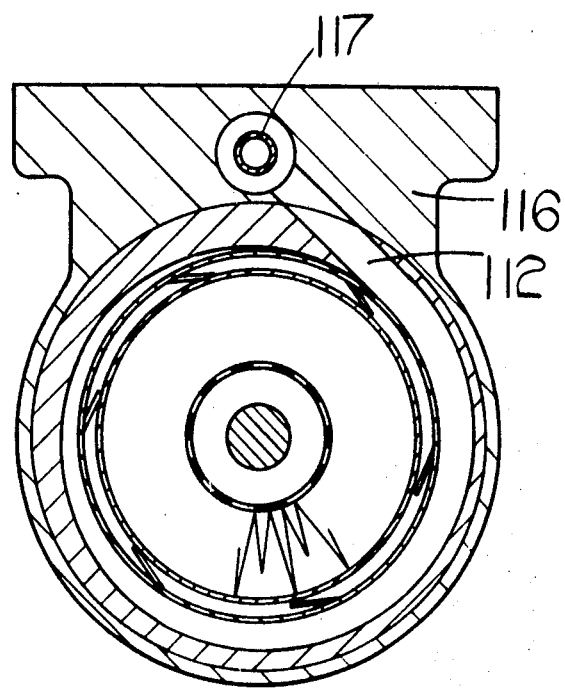
FIG. 4 is a section on line 4—4 in FIG. 2.

In the example of the invention shown in FIGS. 2 and 3 the filter element 28 is the same as that described above and the arrangements whereby it is supported within the casing, constituted by the body 110 are very similar to the arrangements described above. The lid 11 is again held onto the body by a bayonet fixing but the arrangement for holding the casing within the support 116 makes use of pivotably mounted latch members 143 mounted on lugs 144 on the support 116, the members 143 being screw threaded and having nuts 145 thereon which can be clamped over a rim 111a on the lid 111.

The outlet passage 114 in the lid 111 extends through a lateral projection 111b thereon and opens onto a face of this projection lying in a radial plane. This face mates with an end face of the support 116 and when the casing is assembled with the support and communication is thereby established between the passage 114 and the corresponding outlet passage 117 in the support. The inlet passage, 112, opens onto a cylindrical surface of the casing as before.

The procedure for servicing and replacement of the filter element is as outlined above.

I claim:

1. Liquid-filtering equipment comprising a casing constituted by a hollow body and a lid therefor, means for supporting a filter element within the casing, a liquid inlet and a liquid outlet in the casing, arranged so as to be separated, in use, by the filter element and a valve means between the filter element and the liquid outlet, the said valve means incorporating a seat-forming part of the filter element, a closure member supported by the filter element and engageable with the casing and a spring biasing the closure member towards the seat, the casing being adapted to be received in an opening in a support therefor with the liquid inlet and outlet passages in the casing respectively in communication with liquid inlet and outlet ports in the support, the arrangement being such that the casing can be removed from the support as a unit without disturbing the filter element relative to the casing and further that the valve means is automatically shut to isolate the downstream side of the filter element for atmosphere when the filter element is removed from the casing.

2. Liquid-filtering equipment as claimed in claim 1 in which the filter element comprises a perforated sleeve having flanges at the ends thereof which support an annular paper filter.

3. Liquid-filtering equipment as claimed in claim 1 in which the filter-element-supporting means comprises a spring-loaded locating member having a flange which sealingly engages one of the flanges of the filter element and urges the other flange of the filter element into sealing engagement with the lid.

4. Liquid-filtering equipment as claimed in claim 1 in which the lid is engaged on the body by means of a bayonet-type fastening.

5. Liquid-filtering equipment as claimed in claim 1 in which the casing is secured within the support by retaining means.

6. Liquid-filtering equipment as claimed in claim 5 in which the retaining means includes a plurality of threaded latch members pivotally mounted on the support and having nuts engageable with the casing.

7. Liquid-filtering equipment as claimed in claim 5 in which the retaining means includes a plurality of radially slidable bolts mounted on the lid and engageable in the support.

8. Liquid-filtering equipment as claimed in claim 7 in which the bolts are urged into their engaged positions by a cam.

9. Liquid-filtering equipment as claimed in claim 1 in which the liquid inlet communicates with a volute groove formed in the sidewall of the body.

10. Liquid-filtering equipment as claimed in claim 9 in which the liquid inlet enters the volute groove tangentially.

11. Liquid-filtering equipment as claimed in claim 1 in which the filter element includes a perforated sleeve and an annular filter surrounding the sleeve, the valve closure member being supported within the sleeve and being engageable with the lid of the casing.

12. Liquid-filtering equipment as claimed in claim 11 in which the valve means is provided at one end of the sleeve and which includes a closure element for shutting off the other end of the sleeve.

13. Liquid-filtering equipment as claimed in claim 12 in which the sleeve is formed at the said other end with a flange which has a portion extending inwardly of the sleeve and the closure element is biased into engagement with the said inwardly extending portion of the flange by the said spring.